United States Patent Office 3,823,105
Patented July 9, 1974

---

3,823,105
PROCESS FOR THE POLYMERIZATION OF DODECALACTAM IN THE PRESENCE OF BORIC ACID
Genevieve Morival and Remy Hebert, Serquigny, France, assignors to Societe Anonyme dite: Aquitaine Total Organico Tour Aquitaine, Courbevoie, France
No Drawing. Filed Oct. 21, 1971, Ser. No. 191,475
Claims priority, application France, Oct. 26, 1970, 7038556
Int. Cl. C08g 20/10
U.S. Cl. 260—18 N    18 Claims

ABSTRACT OF THE DISCLOSURE

The present invention concerns a process for the polymerization of dodecalactam in the presence of a boric acid, providing a rapid procedure for obtaining a very high yield of polyamides with high molecular weight and with excellent resistance to degradation when kept in a molten state.

Polymerzation takes place preferably at a temperature between 290 and 320° C., in the presence of 0.05 to 2% boric acid.

The polymers obtained are easy to use in the production of moulded articles, sheets, tubes and pipes, by injection, extrusion or blowing.

---

The present invention concerns a process for the polymerization of dodecalactam in the presence of boric acid, providing a rapid procedure for obtaining a very high yield of polyamides with particularly useful properties, notably regarding molecular weight and resistance to degradation.

It is known that dodecalactam can be converted into polydodecanamide or 12 polyamide by heating it in the presence of inorganic acids such as phosphoric or hypophosphorous acid, or in the presence of organic acids such as acetic, adipic or sebacic acid. Polymerization can also be effected in the presence of small quantities of basic substances such as hexamethylene diamine.

These catalysts facilitate polymerization and speed it up by first opening the 12-carbon-atom cycle, thus turning the dodecalactam into amino-dodecanoic acid. The reaction then continues by polyaddition. These catalysts, however, limit the molecular weight of the polymer, by partly blocking the free acid or amine functions of the polyamide as it forms. In addition, since they do not remain inactive in the final polymer, they usually have an adverse effect on the molecular weight of the polyamide, which shows a tendency to degradation when kept molten.

The process, according to the present invention, provides a way of obtaining, very rapidly and with a yield of more than 99%, polyamides with high molecular weight and almost no residual dodecalactam, and with excellent resistance to degradation when kept molten during processing operations such as extrusion or injection, even under humid conditions.

The present invention concerns a process for polymerizing dodecalactam in the presence of boron acids or their salts and anhydrides, at a temperature of at 280° C. or above during most of the polymerization reaction, and preferably, between 290 and 320° C.

The most commonly used boron compounds for this catalysis should be boric acids such as metaboric, orthoboric, pyroboric and tetraboric acids. The amount of catalyst is usually between 0.05 and 2% of the weight of the mixture to be polymerized, and preferably between 0.1 and 0.5%.

According to one feature of the present invention, additional catalysts may be used in conjunction with the boron compounds, so as to provide greater control over the melting viscosity of the polyamide obtained. These generally consist of mono- or dicarboxylic organic acids such as acetic, propionic, caproic, caprylic, lauric, stearic, adipic and sebacic acids and mixtures of them. Preference should be given, however, to monocarboxylic acids such as acetic acid.

Inorganic acids such as phosphoric or hypophosphorous acid may also be used as additional catalysts.

According to the one embodiment of the present invention, the dodecalactam may be polymerized on its own, or mixed with other monomers which can produce polyamides. These monomer mixtures for polymerization should contain more than 50% moles of dodecalactam. The comonomers that can be used include lactams such as caprolactam, oenatholactam and capryllactam, amino-acids such as amino-caproic and amino-undecanoic acid, diacid and diamine salts such as hexamethylene diamine adipate, hexamethylene diamine sebacate and dilinoleic acid salt with diamine dimer.

During the process, the catalyst is added to the monomeric lactam, and the dodecalactam is turned into 12 polyamide, in the presence of water if necessary, at temperatures of between 280 and 335° C., and at high pressure, normal pressure or even in a vacuum. It is advisable to perform the first stage of the reaction under pressure, and later reduce the pressure, in an inert gas atmosphere, such as nitrogen or carbon dioxide. The last stage may also be carried out in a vacuum, in order to remove the water vapour that forms more quickly.

The process may be performed continuously or intermittently in existing lactam polymerization apparatuses, such as tubes allowing simple continuous reaction, or in autoclaves with or without stirring devices.

Polymerization may also be performed in the presence of heat or light stabilizing agents, plasticizers, fillers, matting agents, pigments, colouring agents or other similar substances.

The length of the operation may vary depending on the degree of polymerization required, and the temperature and concentration of catalyst. It is usually between 2 and 10 hours.

The whole operation may be performed at a single temperature, above 280° C., but it is also possible to complete it at lower temperatures, such as 250° C. or so, or even at temperatures below the melting point of the polyamide, in other words below 180° C.

The polymers obtained by means of the process according to the present invention are suitable for use in all cases requiring polyamides, particularly those with low moisture absorbency, good dielectric properties and dimensional stability, as required for toothed wheels, boxes, screws, etc. These polymers can easily be used to manufacture moulded articles, sheets, tubes or pipes, by injection, blowing or extrusion. Because of the very low amount of residual monomer or other soluble substances present, sheets made from such polyamides can be used for sterile wrapping of foodstuffs.

These polymers may also be used to manufacture powders for coatings.

The present invention is illustrated by, without in any way being confined to, the following examples.

Example 1

14 kg. of dodecalactam, 420 cc. of distilled water, 0.15% orthoboric acid and 0.1% acetic acid (calculated as percentages of the weight of dodecalactam) are placed in turn in a small polymerization autoclave.

The air is removed from the autoclave by draining with nitrogen, and it is tightly closed and heated to 300° C. The pressure is raised to 25 kg., and it is kept at this temperature and pressure for 2 hours. The pressure is then gradually released over about 4 hours, until it reaches atmospheric level. A slow, uninterrupted current of nitrogen is blown over the surface of the molten mixture, and after about 45 minutes the polymer is extruded through a nozzle at the bottom of the autoclave. This polyamide is passed through cold water to cool it, flaked, and dried until the moisture content is approximately 0.04%. The amount of residual lactam is less than 0.5%. The melting viscosity is measured by means of an apparatus similar to the ASTM D 1238 melt indexer, and it is found that the quantity, heated to 240° C. and extruded at a pressure of 2 kg./sq. cm., through a nozzle 3 mm. in diameter and 9 mm. long, is 600 to 700 mg.

The inherent viscosity, in metacresol at 20° C., is 1.57 for a concentration of 0.5%.

Comparison with a similar test done without boric acid shows that 2½ hrs. polycondensation are required, instead of only 45 minutes, to obtain a 12 polyamide with the same melting viscosity.

Tubing is then made by extrusion, using granules of the polyamide of this example and of the polyamide without boric acid.

Both types of granules have a moisture content of 0.05%, and they are used to feed the hopper of an extruder with a nozzle for 10–14 mm. tubing at the end.

It is found that, in view of the type of extruder used, average temperatures of around 220° C. are needed.

Operating at identical temperatures in both cases, it is found that:

the inherent viscosity (measured in metacresol at 20° C. and an 0.5% concentration) of the 12 polyamide tube made from the substance obtained in this example is 1.56, i.e. the same as that of the original granules;

the viscosity of the 12 polyamide tubing made from the comparative substance has dropped to 1.46, indicating the beginning of degradation.

Example 2

15 g. of dodecalactam and 75 g. of orthoboric acid dissolved in 400 cc. of water are placed in turn in a stainless steel autoclave heated by Dowtherm circulation.

The air is drained with nitrogen, and the autoclave is heated gradually to 300° C., over a period of 2 hours. The pressure is then 12 kg. It is kept at this temperature and pressure for 5 hours, following which the substance is extruded, under slight nitrogen pressure, through a nozzle at the base of the autoclave, in the form of a liquid which is cooled and solidified by passing between two water-cooled steel cylinders. The inherent viscosity of the prepolymer is measured at 20° C. in an 0.5% metacresol solution, and is found to be 0.6. The residual dodecalactam content is 0.4%.

The prepolymer is then kept at 150° C. for 8 hours, by which time the inherent viscosity of the 12 polyamide has reached 0.95.

What is claimed is:

1. A process for the polymerization of dodecalactam comprising polymerizing said dodecalactam at a temperature of between 280 and 335° C., in the presence of a catalyst consisting of 0.05 to 2%, by weight of the mixture, of a boron acid or a salt or anhydride of said acid.

2. A process for the polymerization of dodecalactam according to claim 1, in which said polymerization is performed in the presence of a boric acid.

3. A process for the polymerization of dodecalactam according to claim 2, in which polymerization is performed in the presence of orthoboric acid.

4. A process for the polymerization of dodecalactam according to claim 2, in which the concentration of boric acid in the reaction mixture is between 0.05 and 2%.

5. A process for the polymerization of dodecalactam according to claim 4, in which the concentration of boric acid in the reaction mixture is between 0.1 and 0.5%.

6. A process for the polymerization of dodecalactam according to claim 1, in which the temperature is between 290 and 320° C.

7. A process for the polymerization of dodecalactam according to claim 1, in which polymerization is performed in the presence of an additional catalyst selected from the group consisting of an aliphatic monocarboxylic acid having 1 to 18 carbon atoms, a dicarboxylic aliphatic acid having 4 to 8 carbon atoms, phosphoric acid, phosphorous and hypophosphorous acid, and mixtures thereof.

8. A process for the polymerization of dodecalactam according to claim 7, in which the dicarboxylic acid is adipic acid or sebacic acid.

9. A process for the polymerization of dodecalactam according to claim 7, in which the monocarboxylic acid is acetic acid.

10. A process for the polymerization of dodecalactam according to claim 7, in which the additional catalyst is phosphoric acid.

11. A process for the polymerization of dodecalactam according to claim 7, in which the additional catalyst is hypophosphorous acid.

12. A process for the polymerization of dodecalactam according to claim 1 wherein the dodecalcatam is polymerized in the presence of a material selected from the group consisting of caprolactam, oenantholactam, capryllactam, amino-caproic acid, amino-undecanoic acid, hexamethylene diamine adipate, hexamethylene diamine sebacate and dilinoleic acid salt with diamine dimer.

13. A process for the polymerization of dodecalactam according to claim 12, in which dodecalactam is polymerized in the presence of caprolactam.

14. A process for the polymerization of dodecalactam according to claim 12, in which the dodecalactam is polymerized in the presence of amino-undecanoic acid.

15. A process for the polymerization of dodecalactam according to claim 16, in which the dodecalactam is polymerized in the presence of a salt of a diacid with a diamine.

16. A process for the polymerization of dodecalactam according to claim 12, in which the dodecalactam is polymerized in the presence of hexamethylene diamine adipate.

17. A process for the polymerization of dodecalactam according to claim 12, in which the dodecalactam is polymerized the presence of a dilinoleic acid salt with the diamine dimer.

18. A process according to claim 1 wherein the boron acid is selected from the group consisting of boric acid, metaboric acid, orthoboric acid, pyroboric acid and tetraboric acid.

References Cited

UNITED STATES PATENTS

| 3,394,156 | 7/1968 | Kornicker et al. | 260—78 |
| 3,017,392 | 1/1962 | Butler et al. | 260—78 |
| 3,564,599 | 2/1971 | Schaaf et al. | 260—78 |
| 3,583,951 | 6/1971 | McGrath | 260—78 |
| 3,562,224 | 2/1971 | Kochhar | 260—78 |
| 3,317,482 | 5/1967 | Kunde et al. | 260—78 |
| 3,607,971 | 9/1971 | McGrath | 260—78 |
| 3,488,326 | 1/1970 | VanBeveren et al. | 260—78 |
| 3,410,832 | 11/1968 | Griehl et al. | 260—78 |
| 3,240,732 | 3/1966 | Ham et al. | 260—78 |
| 3,426,096 | 2/1969 | Anderson | 260—78 |

FOREIGN PATENTS

| 1,267,428 | 5/1968 | Germany | 260—78 |

HOSEA E. TAYLOR, Primary Examiner

E. C. RZUCIDLO, Assistant Examiner

U.S. Cl. X.R.

260—78 A, 78 L

UNITED STATES PATENT OFFICE
CERTIFICATE OF CORRECTION

Patent No. 3,823,105     Dated July 9, 1974

Inventor(s) Genevieve Morival, et al

It is certified that error appears in the above-identified patent and that said Letters Patent are hereby corrected as shown below:

Column 1, Line 21: "Polymerzation" should be --Polymerization--

Column 3, Line 39: "15 g" should be --15 kg--

Column 4, Line 37: "Claim 16" should be replaced by --Claim 12--

Column 4, Line 46: "polymerized the presence" should be --polymerized in the presence--

Signed and sealed this 19th day of November 1974.

(SEAL)
Attest:

McCOY M. GIBSON JR.
Attesting Officer

C. MARSHALL DANN
Commissioner of Patents